US006343336B1

(12) United States Patent
Norton, Jr. et al.

(10) Patent No.: US 6,343,336 B1
(45) Date of Patent: Jan. 29, 2002

(54) TRANSFER FUNCTION COMPATIBILITY FOR INFORMATION FOR INFORMATION STORAGE REPRODUCTION (75) Inventors: David E. Norton, Jr., Boulder; Mark H. Moyer, Westminster, both of CO (US)

(73) Assignee: Exabyte Corporation, Boulder, CO (US)

( * ) Notice: Subject to any disclaimer, the term of this patent is extended or adjusted under 35 U.S.C. 154(b) by 0 days.

(21) Appl. No.: 09/492,344

(22) Filed: Jan. 27, 2000

Related U.S. Application Data
(60) Provisional application No. 60/165,666, filed on Nov. 16, 1999.

(51) Int. Cl.[7] .............................................. G06F 13/22
(52) U.S. Cl. ........................................... 710/65; 710/74
(58) Field of Search ................................. 348/163, 408; 708/311, 322; 710/1, 58, 60, 62, 65, 70, 74

(56) References Cited

U.S. PATENT DOCUMENTS 4,212,072 A * 7/1980 Huelsman et al. .......... 348/163
5,051,942 A * 9/1991 Matsumoto et al. ........ 708/300
5,075,678 A * 12/1991 Ohlsson et al. ............. 341/131
5,381,349 A * 1/1995 Winter et al. ............... 364/526

* cited by examiner

Primary Examiner—B. James Peikari
(74) Attorney, Agent, or Firm—Nixon & Vanderhye, P.C.

(57) ABSTRACT

Method and apparatus are provided for enabling a reproducing apparatus, having a read channel which utilizes a second transfer function, to recover accurately data which has been recorded on a medium with a first transfer function. A compatibility circuit (73) derives a data rate from the medium, and causes the read channel to sample the data steam acquired from the medium at a multiple of the data rate, thereby creating a multiply-sampled data stream. Further, the compatibility circuit manipulates the multiply-sampled data stream to generate a deformatted read data stream. In particular, a deformatter (62) of the compatibility circuit selects only some bits of the multiply-sampled data stream to generate a modified data stream; and the applies a reverse of the first transfer function to generate a deformatted read data stream.

25 Claims, 9 Drawing Sheets

TRANSFER FUNCTION COMPATIBILITY FOR INFORMATION FOR INFORMATION STORAGE REPRODUCTION

This application claims the benefit and priority of United States provisional patent application 60/165,666 filed Nov. 16, 1999, which is incorporated herein by reference.

BACKGROUND

1. Field of the Invention

The present invention pertains to information recording and reproduction, and particularly to transfer function compatibility for information reproduction.

2. Related Art and Other Considerations

In the field of information recording and reproduction a head or transducing element is utilized to transduce (e.g., read and write) information relative to a recording medium (e.g., magnetic tape or disk). Typically information recording/reproducing apparatus have a write channel which prepare data for being recorded by the head as signals on the medium, and likewise a read channel which processes signals obtained by the head from the medium prior to transmission to some utilization device, e.g., a host computer or the like. Read channels generally perform various operations relative to the signals acquired from the medium, such as deformatting, for example.

Figure 8A:
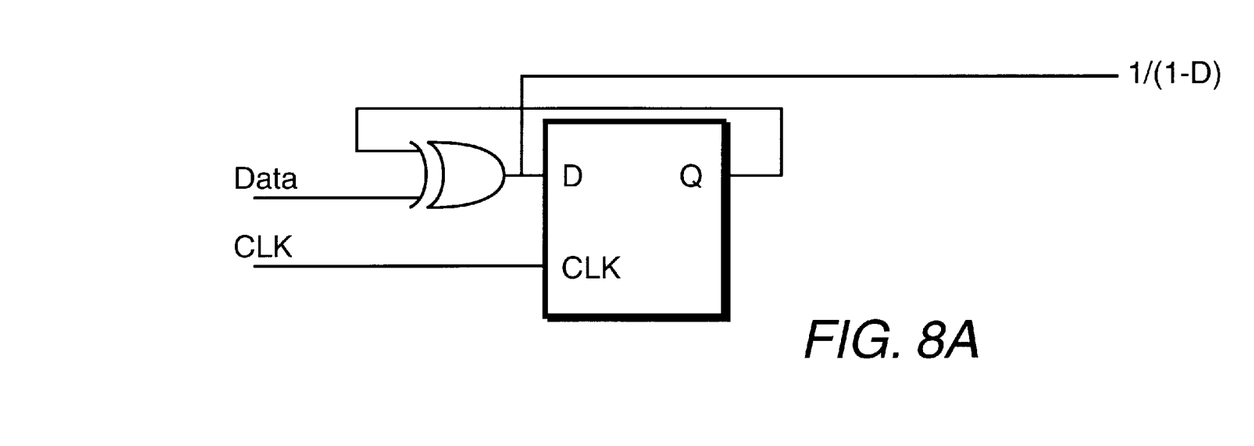
FIG. 8A is a schematic view of a precoder circuit for a $1/(1-D)$ transfer function.

Some read channels assume that the data recorded on the medium has been recorded with a certain transfer function or precode. For example, one type of read channel assumes that a $1/(1-D)$ precode has been utilized for the recording data. The effect of this $1/(1-D)$ precode is to convert a data stream where "1"s represent transitions into the current waveform in the head. The "D" in the $1/(1-D)$ precode is called the "delay operation", which for practical purposes of the present invention can refer to a clock period. FIG. 8A shows an example circuit that can be utilized to apply the $1/(1-D)$ precode to an input data stream.

Figure 8B:
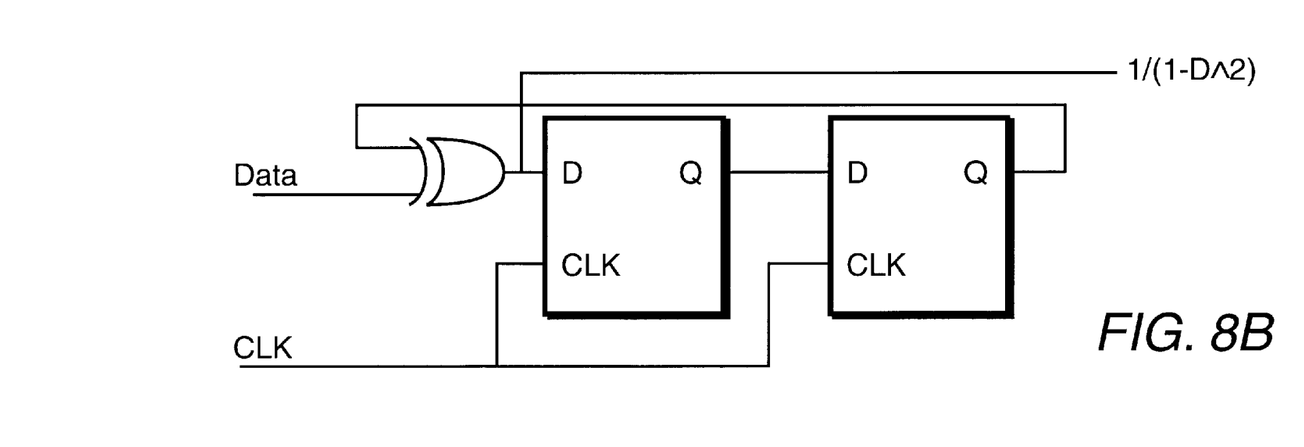
FIG. 8B is a schematic view of a precoder circuit for a $1/(1-D^2)$ transfer function.

Other types of read channels assume other types of precode. For example, an EPR4 read channel utilizes a transfer function or precode of $1/(1-D^2)$. FIG. 8B shows an example circuit that can be utilized to apply the $1/(1-D^2)$ precode to an input data stream. By contrast, whereas the read channel having the precoder of FIG. 8A had one flip/flop feed back, the precoder for the $1(1-D^2)$ transfer function has two flip/flops in the feed back. Whereas in the $1/(1-D)$ precoder energy in the precoded data is maximized at the clock rate, in the $1/(1-D^2)$ precoder the energy is zero at the clock rate and maximized at just under on half of the clock rate.

Because of a difference in preceding, data recorded on a medium using a first transfer function (e.g., the $1/(1-D)$ transfer precode) cannot normally be read back by a read channel that uses a second transfer function (e.g., the $1/(1-D^2)$ precode). This is problematic when attempting to read, using apparatus with the second type read channel, medium having data recorded using the first transfer function. Such problems can arise, for example, when a first generation recording/reproducing device utilized the first transfer function and a later generation recording/reproducing device utilizes a read channel having the second transfer function.

It is feasible to design a recording/reproducing device with multiple read channels for handling respective multiple transfer functions, and thereby provide some measure of assurance for reading an otherwise incompatible medium. However, the cost of providing (and, in operation, administering) multiple read channels is objectionable.

What is needed, therefore, and an object of the present invention, is a technique for reading a first-precoded data recording on a medium using a second-precode read channel.

BRIEF SUMMARY OF THE INVENTION

Method and apparatus are provided for enabling a reproducing apparatus, having a read channel which utilizes a second transfer function, to accurately recover data which has been recorded on a medium with a first transfer function. A compatibility circuit derives a data rate from the medium, and causes the read channel to sample the data steam acquired from the medium at a multiple of the data rate, thereby creating a multiply-sampled data stream. Further, the compatibility circuit manipulates the multiply-sampled data stream to generate a deformatted read data stream. In particular, a deformatter of the compatibility circuit selects only some bits of the multiply-sampled data stream to generate a modified data stream, and then applies a reverse of the first transfer function to generate a deformatted read data stream.

In an illustrated embodiment, the compatibility circuit comprises a phase lock-loop which derives the data rate from the medium and which causes the read channel to sample the data steam acquired from the medium at the multiple of the data rate. The deformatter comprises both a bit selector (which selects only some bits of the multiply-sampled data stream to generate the modified data stream), and a first transfer function reversal unit (which applies a reverse of the first transfer function to generate the deformatted read data stream).

Thus, the compatibility circuit samples the data stream as if the data stream were recorded using the second transfer function, but with the sampling occurring at the multiple of the data rate to create the multiply-sampled data stream. The compatibility circuit does not utilize the entire multiply-sampled data stream for user data recovery, but rather only selected bits of the modified data stream. Preferably, the selected bits of the modified data stream are alternating bits thereof. One example employment of the invention is when the first transfer function involves a $1/(1-D)$ precode and the second transfer function involves a $1/(1-D^2)$ precode, in which case the data rate multiple is two. Moreover, the invention provides an enhanced error detection capability by checking the output data by comparing the selected bits of the multiply-sampled data stream with non-selected bits, and detecting an error if the selected bits do not agree with the non-selected bits.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1A ; FIG. 1B.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

The present invention addresses the problem of processing a data stream acquired via a read channel from an information storage medium when the data stream acquired by the read channel has been recorded on the medium with a first transfer function, but the read channel utilizes a second transfer function. Briefly, in accordance with the present invention, the data steam acquired from the medium is sampled as if it were recorded using the second transfer function, but at a multiple of the data rate, thereby creating a multiply-sampled data stream. The invention then selects certain bits of the multiply-sampled data stream for transmission as a modified data stream, and then performs a transform function reversal (using the first transfer function). Preferably, the selected bits of the modified data stream are alternate bits thereof.

Figure 1A:
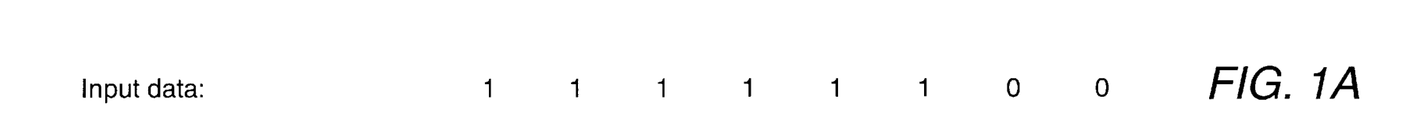
Figure 1B:
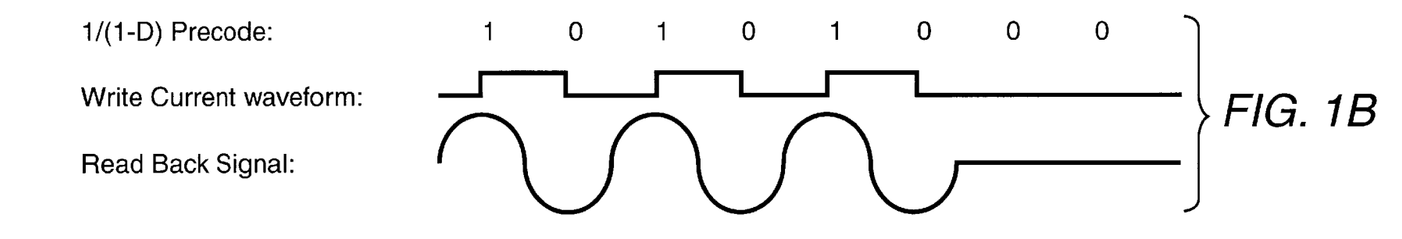
Figure 1C:
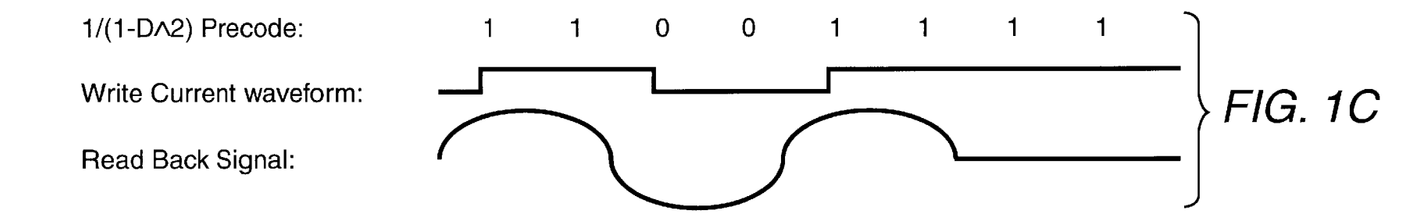
FIG. 1C and FIG. 1D are diagrammatic views showing various data patterns, write current waveforms, and read back signals scaled with respect to user data bits for illustrating principles of the present invention.
Figure 1D:
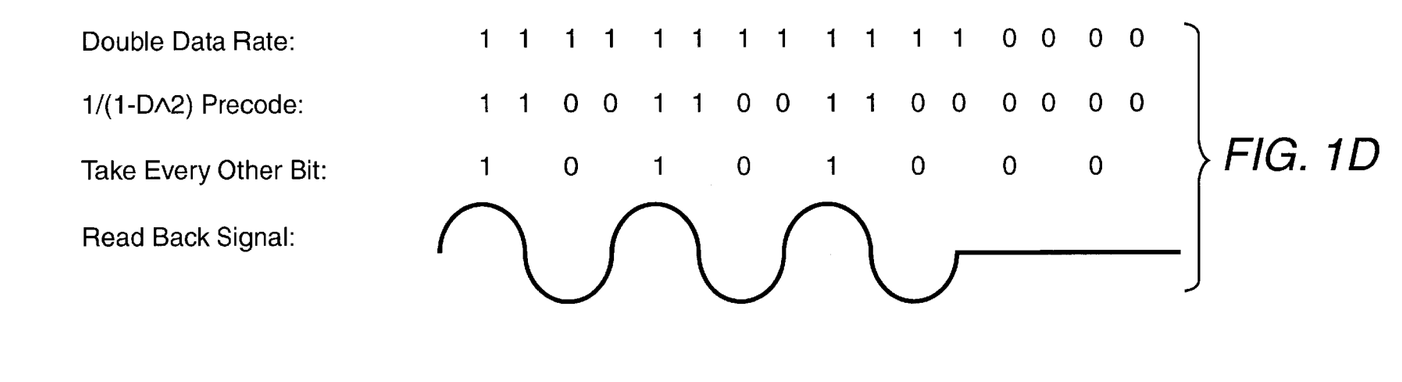

Principles of the present invention are illustrated in FIG. 1A, FIG. 1B, FIG. 1C and FIG. 1D, all of which are illustrated in alignment (e.g., scaled) with respect to user data bits (rather than with respect to time). FIG. 1A in particular shows an example or representative byte of data. It has been assumed, e.g., for sake of the other figures, that the two preceding output bits were zero. FIG. 1B illustrates how the representative byte of FIG. 1A is processed according to a first transfer function (e.g., the $1/(1-D)$ precode); FIG. 1C illustrates how the representative byte of FIG. 1A is processed according to a second transfer function (e.g., the $1/(1-D)$ precode). FIG. 1D illustrates principles pertaining to the present invention.

The representative input byte of data shown in FIG. 1A has the bits 11111100. When the data stream with this byte is encoded by a $1/(1-D)$ encoder such as that shown in FIG. 8A, the encoded byte has the bits 10101000 as shown in FIG. 1B. When the $1/(1-D)$-encoded version of the representative input byte of FIG. 1A is recorded on the medium, the write current waveform appears as in FIG. 1B. When the $1/(1-D)$-encoded version of the representative input byte of FIG. 1A is read, the read back signal of FIG. 1B results.

By contrast, when the data stream of FIG. 1A is encoded by a $1/(1-D^2)$ encoder such as that shown in FIG. 8B, the encoded byte has the bits 11001111 as shown in FIG. 1C. When the $1/(1-D^2)$-encoded version of the representative input byte of FIG. 1A is recorded on the medium, the write current waveform appears as in FIG. 1C. When the $1/(1-D^2)$-encoded version of the representative input byte of FIG. 1A is read, the read back signal of FIG. 1C results.

Thus, it can be seen by comparing the $1/(1-D)$-precoded read back signal of FIG. 1B with the $1/(1-D^2)$-precoded read back signal of FIG. 1C, that the signals are completely different. From this it will also be understood that a read channel which utilizes the $1/(1-D^2)$ transfer function will not, without modification, recover the intended data for data recorded on the medium with the $1/(1-D)$ transfer function.

The present invention provides method and apparatus for enabling an apparatus having a read channel utilizing a second transfer function to recover accurately data which has been recorded on a medium with a first transfer function. In the particularly illustrated example, apparatus including a $1/(1-D^2)$-utilizing read channel can read medium on which data has been recorded using a $1/(1-D)$ transfer function.

Figure 3A:
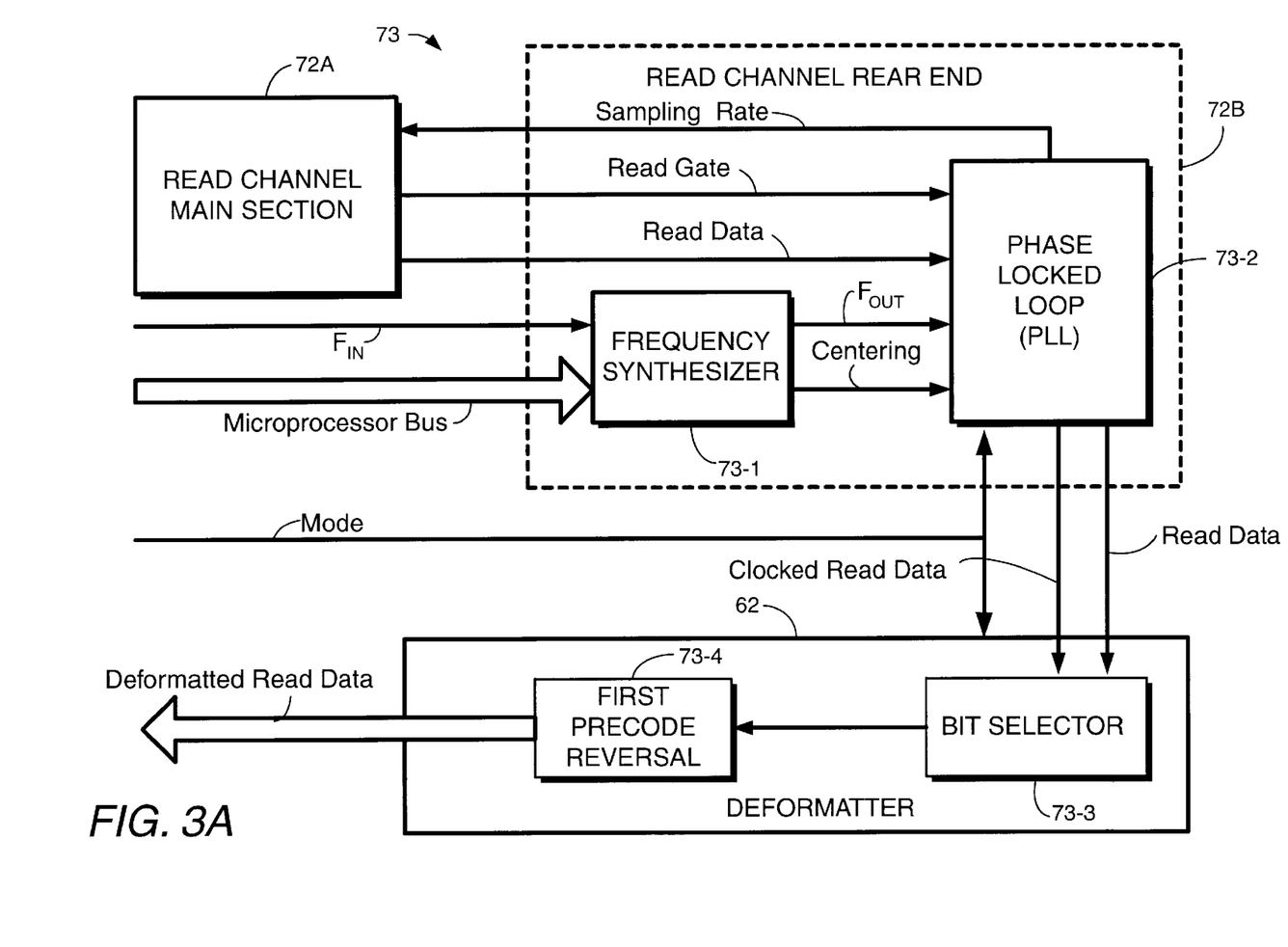
FIG. 3A and FIG. 3B are schematic views of an example transfer function compatibility circuit according to the present invention.

One example arrangement for providing the enablement or transfer function compatibility described above is illustrated in FIG. 3A. In this regard, FIG. 3A shows basic structure of an example transfer function compatibility circuit 73 involved in performing the steps of the invention. The transfer function compatibility circuit 73 includes frequency synthesizer 73-1; phase lock-loop 73-2, and deformatter 62. Signals. utilized by the compatibility circuit 73 of FIG. 3A includes a Read gate signal and Read Data applied to phase lock-loop (PPL) 73-2; a $F_{IN}$ (Write Clock/8) signal and a μp (microprocessor) bus applied to frequency synthesizer 73-1; a $F_{out}$ signal and Centering signal applied from frequency synthesizer 73-1 to phase lock-loop 73-2; Clocked Read Data and a Read Clock signal applied from phase lock-loop 73-2 to deformatter 62; a mode signal input to deformatter 62; and, deformatted read data output from deformatter 62 as the output data of compatibilityt circuit 73.

Figure 7A:
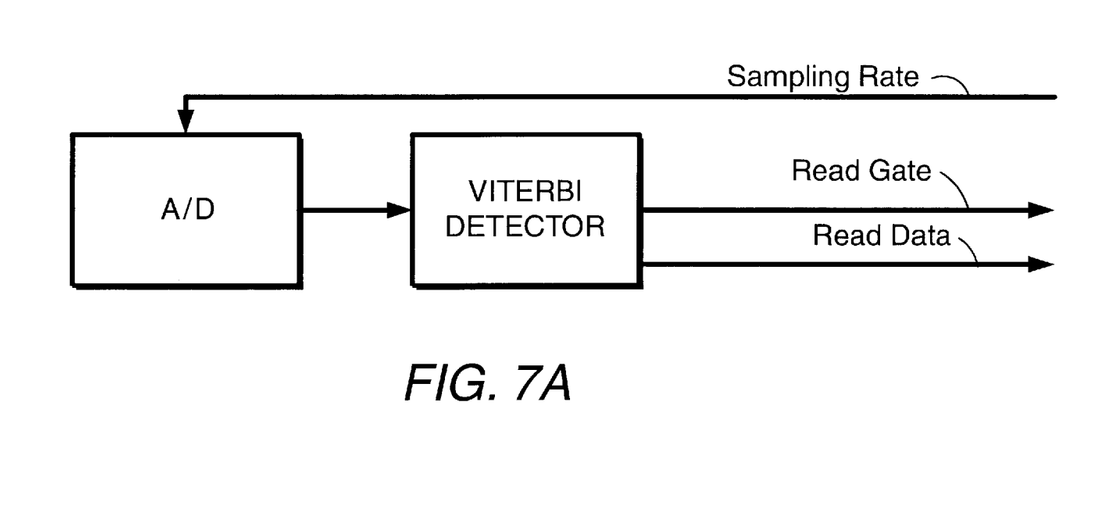
FIG. 7A and FIG. 7B are schematic views of differing types of read channel main sections with which the example transfer function compatibility circuit of FIG. 3A can be utilized.
Figure 7B:
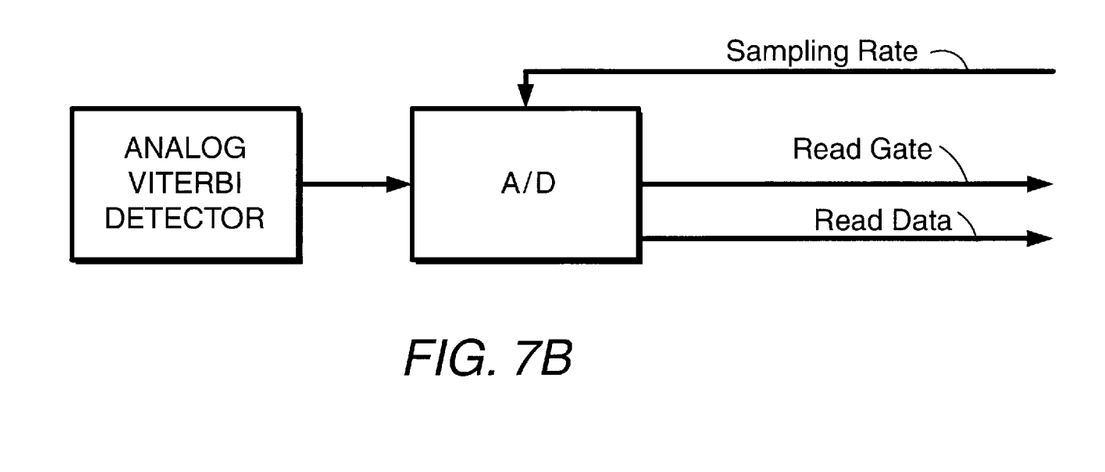

The frequency synthesizer 73-1 and phase lock-loop 73-2 of compatibility circuit 73 are, in the illustrated embodiments, included in a read channel rear end 72B. The Read Gate signal and Read Data are applied to the read channel rear end 72B, and particularly to phase lock-loop 73-2, from a read channel main section 72A. As understood by those skilled in the art, read channel main section 72A can comprise various components forming such functions as gain control, filtering, wave shaping, analog-to-digital conversion, and Viterbi detection. The read channel main section 72A receives a Sampling Rate signal from phase lock-loop 73-2. The Sampling Rate signal can be applied in diverse manners. For example, FIG. 7A shows a particular arrangement of portions of a read channel main section 72A wherein the Sampling Rate Signal is applied to an analog to digital converter (ADC) to control the timing of sampling of an input signal thereto, with the analog to digital converter (ADC) feeding a Viterbi detector. As another example, FIG. 7B shows another arrangement for portions of read channel main section 72A wherein an analog Viterbi detector precedes an analog to digital converter (ADC).

Returning to FIG. 3A, the Read Gate signal enables the compatibility circuit 73 to process the Read Data. In FIG. 3A, the Read Gate signal switches the input of phase lock-loop 73-2 from a training clock ($F_{OUT}$) to the Read Data. The training clock is used to hold the phase lock-loop 73-2 on frequency when it is not being used. The Read Data is the unlocked read data output from read channel main section 72A. The $F_{IN}$ (Write Clock/8) signal is a reference input to frequency synthesizer 73-1; $F_{OUT}$ is the output clock from frequency synthesizer 73-1. The Centering signal is used to center the operating frequency of the phase lock-loop 73-2. The μp buss is used to program constants of the freqyency synthesizer 73-1, such constants including the constants M and N, and also to program the Center operating frequency of the phase lock-loop 73-2. In the illustrated embodiment, the frequency synthesizer 73-1 utilizes the relation $F_{OUT=(M/N)*FIN}$. The Clocked Read Data is the raw Read Data reclocked after it has had the clock extracted from it by phase lock-loop 73-2. the reclocking is performed in accordance with the Read Clock signal, which is either the nominal clocking signal or the multiple thereof. The mode signal is input to deformatter 62 and to phase lock-loop 73-2 to indicate which transfer function mode is applicable (e.g., either the first transfer function mode [1/(1−D)] (when a compensation or compatibility is necessary, e.g., the "compensation" or "compatibility" mode) or the second transfer function mode [1/(1−D²)]). The deformatter 62 has two basic functions here pertinent, particularly a bit selection function 73-3 and a first precode reversal function or unit 73-4. The Deformatted Read Data output from deformatter 62 is the clocked read data after it has been deformatted, which means that the native precode has been removed.

Figure 2:
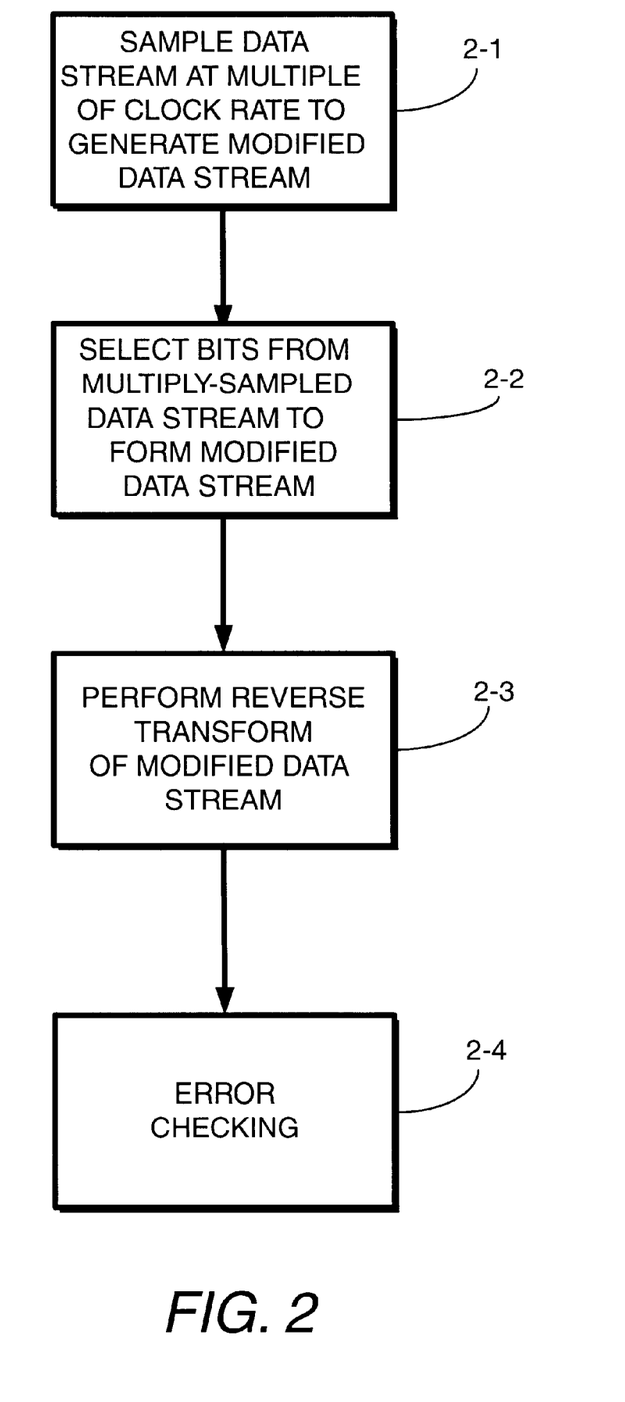
FIG. 2 is a flowchart showing basic steps implemented in accordance with the present invention.

The invention provides compatibility of transfer functions in accordance with the basis steps of a compatibility or compensation scheme shown in FIG. 2. In other words, the steps of FIG. 2 are performed when it is determined that there needs to be a compensation to afford the reading apparatus compatibility for data recorded using a different transfer function. In connection with the ensuing discussion of FIG. 2 in the context of FIG. 3A, reference is also made to FIG. 1D(1) through FIG. 1D(4), and the following assumptions are made (1) the analog read back signal obtained from the medium has the waveform shown in FIG. 1D(4); (2) the input (user) data that resulted in the read back signal of FIG. 1D(b 4) was the input data byte shown in FIG. 1A; and (3) the input (user) data that resulted in the read back signal of FIG. 1D(4) was precoded using the 1/(1−D) transfer function.

In accordance with step 2-1, the data stream (of user data) acquired from the medium is sampled using read channel main section 72A. Whereas the data stream was recorded on the medium using a first transfer function [e.g., 1/(1−D)], the read channel main section 72A operates with a differing transfer function, e.g., second transfer function [e.g., 1/(1−D²)]. The data stream, although recorded with the first transfer function, is sampled at step 2-1 as if the data thereon were recorded using the first [e.g., 1/(1−D²)] transfer function. However, the sampling of step 2-1 occurs at a multiple (e.g., twice) of the data rate recovered from the clocking signals recorded on the medium along with the data stream. In this regard, the signal Sampling Rate from phase lock-loop 73-2 is applied to read channel main section 72A to control the sampling rate of the analog to digital converter.

In the above regard, the phase lock-loop 73-2 derives the data rate of the selfclocking data obtained from the medium in accordance with conventional practice. When the compatibility or compensation mode is in effect, the phase lock-loop 73-2 uses a multiple (e.g., twice) of the data rate as the Sampling Rate signal. As a result of application of a doubled Sampling Rate signal in the compensation mode, the read channel main section 72A outputs (for the read back signal of FIG. 1D) the multiply-sampled data stream of FIG. 1D. It is to be noticed that the bit stream of FIG. 1D (i.e., 1100110011000000), in view of the double sampling, has each bit thereof repeated. It is the multiply-sampled data stream of FIG. 1D that is output as the Read Signal from read channel main section 72A to phase lock-loop 73-2.

The phase lock-loop 73-2 passes the multiply-sampled data stream of FIG. 1D to deformatter 62 as the Read Data. In addition, phase lock-loop 73-2 derives the clocking information from the multiply-sampled data stream of FIG. 1D, and applies such clocking as the Clock Read Data signal to deformatter 62. Since, in the compensation or compatibility mode, the sampling occurred at a multiple of the data rate, the Clocked Read Data signal applied to deformatter 62 will be a multiple of what the clock would ordinarily be without the present invention.

As step 2-2, certain bits of the multiply-sampled data stream (e.g., the data stream of FIG. 1D) are selected by compatibility circuit 73 for forming a modified data stream. In particular, the bit selector function (unit) 73-3 of deformatter 62 selects predetermined bits of the multiply-sampled data stream of FIG. 1D. Preferably, in accordance with the illustrated embodiment, the selected bits of the multiply-sampled data stream are alternate bits thereof. Upon electing of alternate bits by bit selector function 73-3, the modified data stream appears as the bit stream of FIG. 1D (i.e., 10101000).

As step 2-3, a reverse transform of the modified data stream is performed for producing a deformatted data stream for transmission as output data, e.g., for transmission to a data buffer and ultimate transmission to a host device (e.g., a host computer). In the particular example of the modified data stream of FIG. 1D (i.e., 10101000), a reverse of the 1/(1−D) is applied by the first precode reversal function (unit) 73-4 of deformatter 62. The operation of the first precode reversal function 73-4 is understood, in the context of the 1/(1−D) precode, with reference to FIG. 8A. In this example, the deformatted data stream produced by first precode reversal function 73-4 is that shown in FIG. 1A. In other words, the compatibility circuit 73 has recovered the very data input byte (user data) byte that was intended for recording on the medium, although the recording was preformed using a first transfer function (e.g., 1/(1−D) precode) and the reproducing apparatus employed a read channel which utilizes a second transfer function (e.g., 1/(1−D²) precode).

Figure 3B:
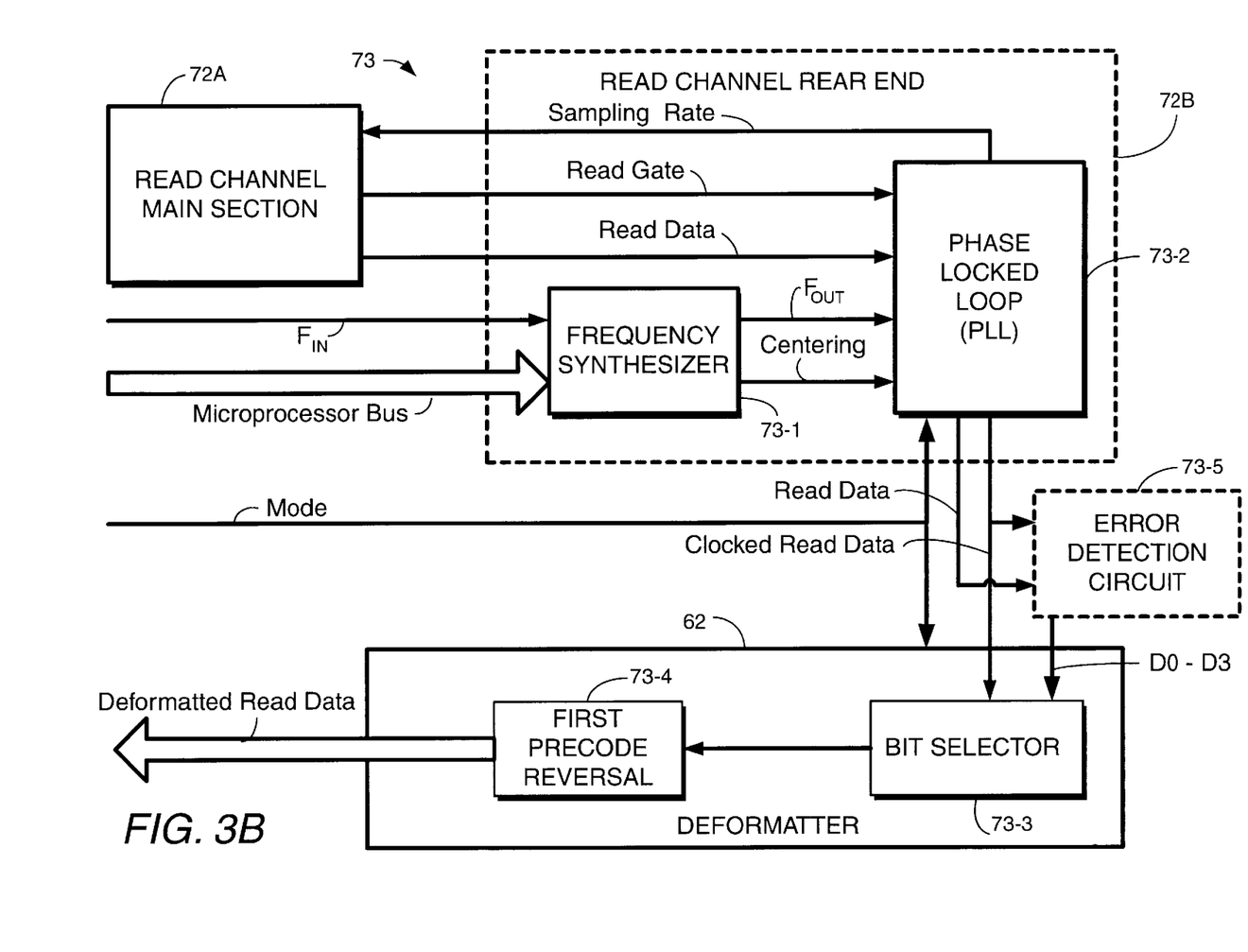

FIG. 3B shows another embodiment of compatibility circuit 73 which implements an optional error checking step 2-4. Error checking step 2-4 can be performed using an error detection circuit 73-5 shown in FIG. 3B. Error detection circuit 73-5 is shown in broken lines in FIG. 3A, and has the Read Data and Clocked Read Data (Read CLK) signals from phase lock-loop 73-2 applied thereto.

Figure 4:
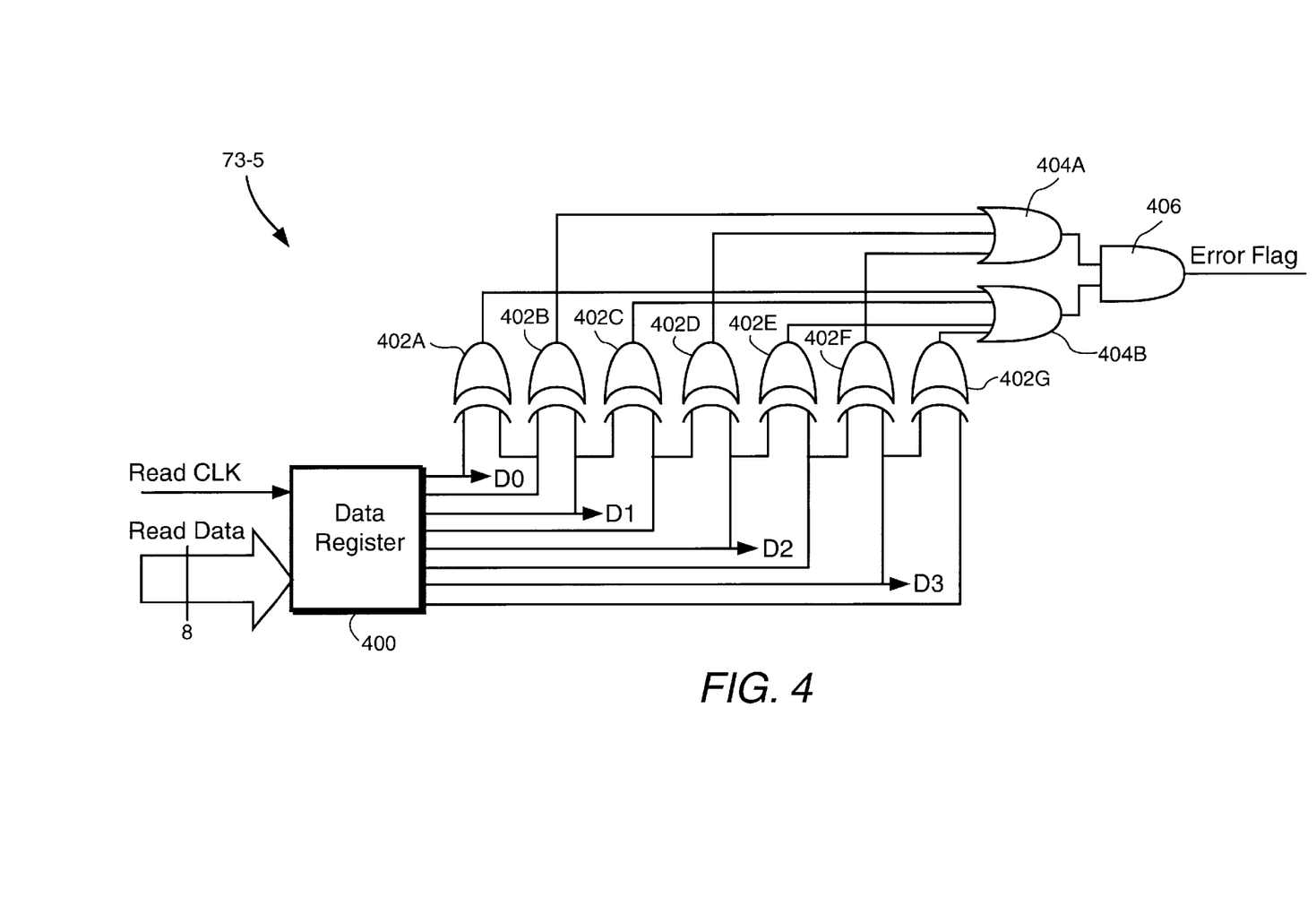
FIG. 4 is a schematic view showing an error detection circuit suitable for use with the present invention.

FIG. 4 is a schematic view showing an example error detection circuit 73-5 suitable for use with the present invention. The error detection circuit 73-5 comprises a Data Register 400 which stores eight bits of read data obtained from phase lock-loop 73-2, e.g., the multiply-sampled data stream. Every other bit (e.g., the even bits) is presented as an output (DO–D3) to deformatter 62. The error detection circuit 73-5 further comprises NOR gates 402A–402G, OR gates 404A and 404B, and AND gate 406. The first bit of Data Register 400 is applied to a first terminal of NOR gate 402A; the second bit of Data Register 400 is applied both to a second terminal of NOR gate 402A and a first terminal of NOR gate 402B; the third bit of Data Register 400 is applied both to a second terminal of NOR gate 402B and a first terminal of NOR gate 402C; and so forth but with the eighth bit of Data Register 400 being applied only to the second terminal of NOR gate 402G. Outputs of NOR gates 402A, 402C, and 402E are applied to input terminals of OR gate 404B; outputs of NOR gates 402B, 402D, and 402F are applied to input terminals of OR gate 404A. The outputs of OR gates 404A and 404B are applied to input terminals of AND gate 406. Thus, the error detection circuit 73-5 of FIG. 4 compares the two copies of bits stored in Data Register 400, and outputs an error (Error Flag) from AND gate 406 if there is not a match. Therefore, since two identical copies of data are being generated according to the present invention, e.g., on line Read Data, a happy circumstance results and facilitates the error checking of step 2-4 in the manner illustrated by FIG. 4.

In connection with the error checking of step 2-4, since the framing of the data is unknown, two comparisons of the data are made, with the first copy in an odd position, and then the first copy in the even position. One of these two positions must have a match or the error output is set. Of course, while the present example employs an eight bit symbol, blocks of other than eight bits can be treated (e.g., by having a register 400 of differing size).

Figure 5:
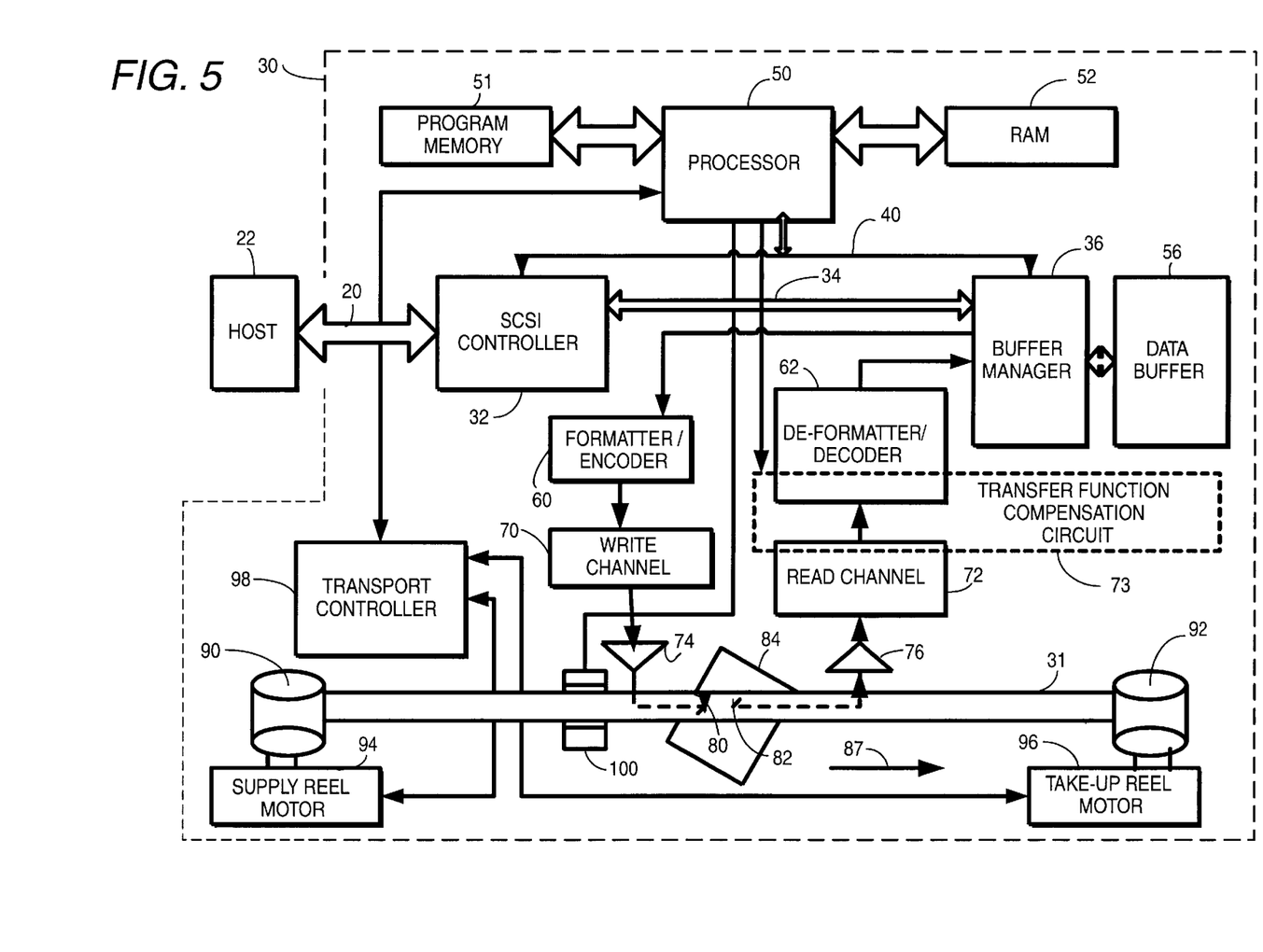
FIG. 5 is a schematic view showing implementation of the transfer function compatibility circuit in an example recording/reproducing device.

FIG. 5 shows how the transfer function compatibility circuit of the invention can be utilized in an example device implementation, the example device being a helical scan magnetic tape drive. FIG. 5 particularly depicts that elements of compatibility circuit 73 are situated to reside both in a read channel 72 and deformatter 62 of the example recording/reproducing apparatus.

Describing other elements of FIG. 5 in more detail, SCSI bus 20 connects a host computer 22 and a first embodiment of a SCSI target storage device, particularly tape drive 30. In the illustrated embodiment, tape drive 30 is shown as a generic helical scan tape drive which transduces information on/from tape 31. Tape drive 30 includes a SCSI controller 32 which is connected to SCSI bus 20. Data bus 34 connects SCSI controller 32 to buffer manager 36. Both SCSI controller 32 and buffer manager are connected by a bus system 40 to processor 50. Processor 50 is also connected to program memory 51 and to a data memory, particularly RAM 52.

Buffer manager 36 controls, e.g., both storage of user data in buffer memory 56 and retrieval of user data from buffer memory 56. User data is data from host 22 for recording on tape 31 or destined from tape 31 to host 22. Buffer manager 36 is also connected to formatter/encoder 60 and to deformatter/decoder 62. Formatter/encoder 60 and deformatter/decoder 62 are, in turn, respectively connected to write channel 70 and read channel 72. Write channel 70 is connected via write amplifier 74 to one or more recording element(s) or write head(s) 80; read channel is connected via read amplifier 76 to one or more read element(s) or read head(s) 82.

Those skilled in the art will appreciate that write channel 70 includes various circuits and elements including a RLL modulator, a parallel-to-serial converter, and write current modulator. Similarly, the person skilled in the art understands that read channel 72 includes a data pattern and clock recovery circuitry, a serial-to-parallel converter, and, an RLL demodulator, as well as other elements aforementioned.

Write head(s) 80 and read head(s) 82 are situated on a peripheral surface of rotating drum 84. Tape 31 is wrapped around drum 84 such that head(s) 80 and 82 follow helical stripes 86 on tape 31 as tape 31 is transported in a direction indicated by arrow 87 from a supply reel 90 to a take-up reel 92. Supply reel 90 and take-up reel 92 are typically housed in an unillustrated cartridge or cassette from which tape 31 is extracted into a tape path that includes wrapping around drum 84.

The present invention is useful with numerous types of helical scan tape drives. For example, in one type of tape drive, tape 31 is transported by an unillustrated capstan which is rotated by a capstan motor. The drum has one write head and one read head, mounted 180 degrees apart on the periphery of the drum. In this type of tape drive, the capstan motor is controlled by transport controller 98, which ultimately is governed by processor 50. An example of this first type of tape drive is the EXB-8200 model tape drive manufactured by Exabyte Corporation, and which is illustrated e.g., in U.S. Pat. No. 4,843,495; U.S. Pat. No. 4,845,577; and U.S. Pat. No. 5,050,018, all of which are incorporated herein by reference.

A second type of tape drive with which the invention is useful is the MammothJ tape drive manufactured by Exabyte Corporation, and which is illustrated e.g., in U.S. Pat. No. 5,602,694, incorporated herein by reference. In this second type of type drive, two write heads and two read heads are mounted on the drum. A supply reel 90 and take-up reel 92 are driven by respective reel motors 94 and 96 to transport tape 31 in the direction 87. Reel motors 94 and 96 are driven by transport controller 98, which ultimately is governed by processor 50. Operation and control of the tape transport mechanism of this second type of tape drive including reel motors 94 and 96 is understood by the person skilled in the art with reference, for example, to U.S. Pat. No. 5,680,269 and incorporated herein by reference.

In the illustrated embodiment of FIG. 5, the processor 50 sends the $F_{IN}$, microprocessor bus, and Mode signals to compatibility circuit 73. In particular, utilizing the read operating having the basic steps shown in FIG. 6, at step 6-1 an unknown cartridge having information storage medium is inserted into the drive 30. An attempt to read the medium in the cartridge is performed as step 6-2. If it is determined by processor 50 at step 6-3 that the read was successful, a conventional mode is implemented (depicted by step 6-4). When the conventional mode of step 6-4 is implemented, the read channel is permitted to operate without the compensation or compatibility techniques of the present invention (e.g., the multiple sampling rate, etc.).

Figure 6:
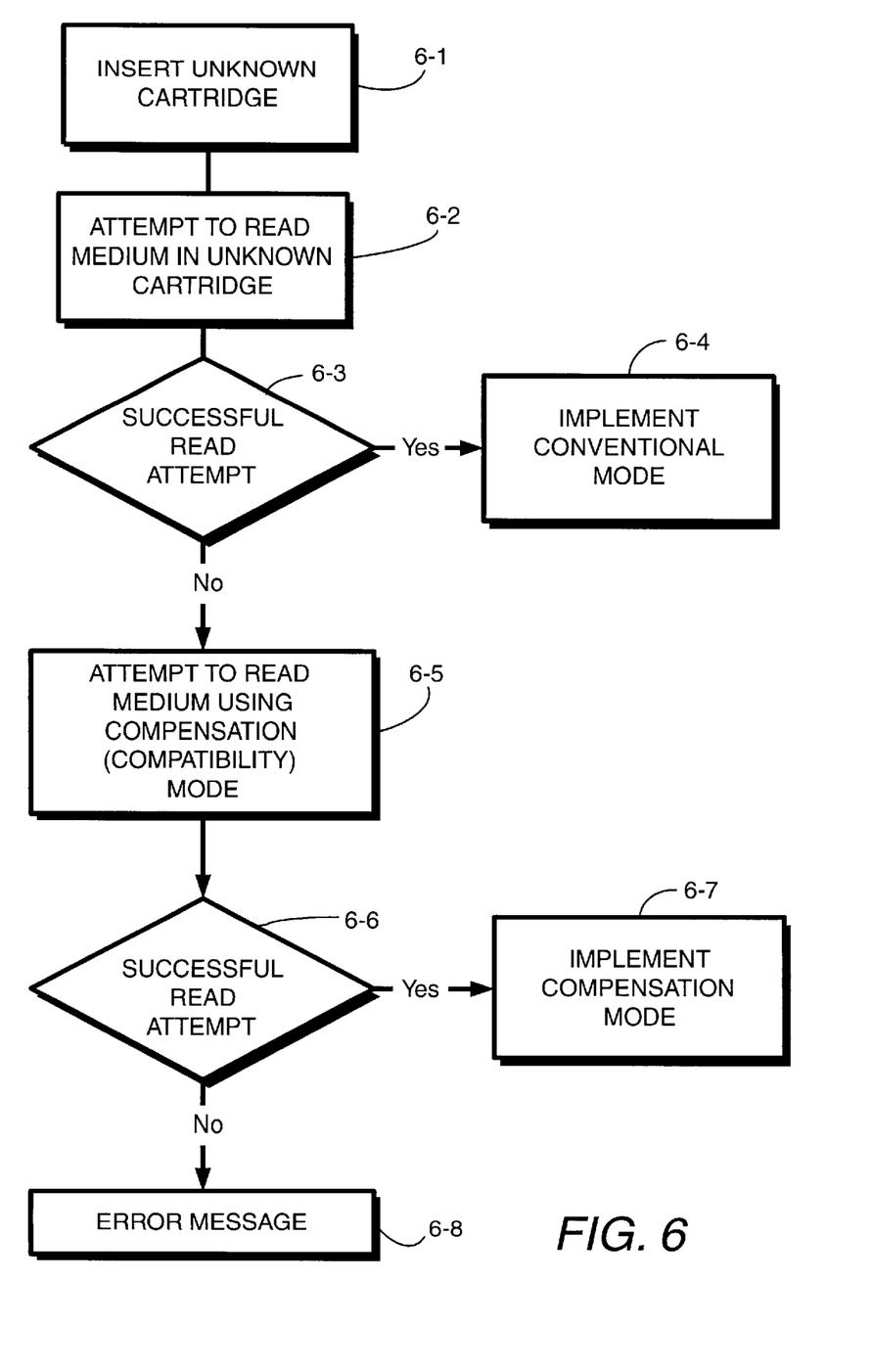
FIG. 6 is a flowchart showing steps involved in a read operation in conjunction with an example implementation of the present invention.

When it is determined at step 6-3 that the medium cannot be read using the conventional mode, at step 6-5 the processor 50 attempts to implement the compensation of compatibility mode of the present invention. In so doing, the processor 50 sends appropriate signals and informatin to compatibility circuit 73, including setting the mode signal in an attempt to read the medium using the compensation or compatibility mode of the present invention. Various aspects of the compensation or compatibility mode are above discussed in connection, e.g., with FIG. 2 and FIG. 3A. If it is determined at step 6-6 that implementation of the compensation or compatibility mode renders the medium readable, the compensation or compatibility mode of the present invention is invoked is depicted by step 6-7. Otherwise, as shown by step 6-8, an error message is generated.

In connection with the reading operation of FIG. 6, the person skilled in the art will appreciate that multiple retries of the modes may be advisable before concluding that a mode is not feasible for the particular medium of the cartridge.

In the present invention, the delay D of the original medium is the same as two delays if each of the delays is half as long. By using such delays, the 0/3 code that was used to encode the 1/(1−D)-precoded medium appears to the 1/(1−D²)-utilizing read channel as a 1/6 code, which falls in the run length constraints of the 0/6 code that the read channel was constructed to use. The method of the invention takes the original data and provides zero filling, meaning that the original data bits are alternated with additional zeros, creating twice as many bits as was originally recorded. No information is added to the original signal, since all of the additional bits are zero. However, this fiction allows the signal to be double clocked, generating twice as many output bits. These bits are then acted upon by the 1/(1−D) precoder when the data was recorded, and then are acted upon by the 1/(1−D²) read channel when read back from the medium. Multiplying these two transfer functions results in a transfer function of 1+D, hence two identical copies of the original data are generated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of processing a data stream acquired by a read channel from an information storage medium, the data stream acquired by the read channel having been recorded on the medium with a first transfer function but the read channel utilizing a second transfer function, the method comprising:

sampling the data steam acquired from the medium as if it were recorded using the second transfer function but at a multiple of the data rate, thereby creating a multiply-sampled data stream;

manipulating the multiply-sampled data stream to generate a deformatted read data stream.

2. The method of claim 1, wherein the multiple of the data rate is twice the data rate.

3. The method of claim 1, wherein the first transfer function is 1/(1−D) and the second transfer function is 1/(1−D²), and wherein D is a delay operator.

4. The method of claim 1, wherein the step of manipulating the multiply-sampled data stream comprises:

selecting only some bits of the multiply-sampled data stream to generate a modified data stream; and applying a reverse of the first transfer function to generate a deformatted read data stream.

5. The method of claim 4, wherein the step of selecting bits of the modified data stream comprises selecting alternating bits of the modified data stream.

6. The method of claim 4, further comprising checking the output data by comparing the selected bits of the multiply-sampled data stream with non-selected bits.

7. A method of operating reproduction apparatus which reads user data stored on an information storage medium, the method comprising:

obtaining a transduced data stream from the medium, the transduced data stream having been recorded using a first transfer function;

applying the transduced data stream to a read channel which utilizes a second transfer function;

sampling with the read channel the transduced data steam as if the transduced data stream were recorded using the second transfer function but at a multiple of a data rate derived from the medium, thereby creating a multiply-sampled data stream;

manipulating the multiply-sampled data stream to generate a deformatted read data stream;

transmitting the deformatted read data stream to a buffer and ultimately to a host device.

8. The method of claim 7, wherein the multiple of the data rate is twice the data rate.

9. The method of claim 7, wherein the first transfer function is 1/(1−D) and the second transfer function is 1(1−D²), and wherein D is a delay operator.

10. The method of claim 7, wherein the step of manipulating the multiply-sampled data stream comprises:

selecting only some bits of the multiply-sampled data stream to generate a modified data stream; and applying a reverse of the first transfer function to generate a deformatted read data stream.

11. The method of claim 10, wherein the step of selecting bits of the modified data stream comprises selecting alternating bits of the modified data stream.

12. The method of claim 10, further comprising checking the output data by comparing the selected bits of the multiply-sampled data stream with non-selected bits.

13. A compatibility circuit which processes a data stream acquired by a read channel from an information storage medium, the data stream acquired by the read channel having been recorded on the medium with a first transfer function but the read channel utilizing a second transfer function, the compatibility circuit comprising:

a phase locked loop which derives a data rate from the medium and which causes the read channel to sampling the data steam acquired from the medium at a multiple of the data rate, the read channel thereby creating a multiply-sampled data stream;

a deformatter which manipulates the multiply-sampled data stream to generate a deformatted read data stream.

14. The apparatus of claim 13, wherein the multiple of the data rate is twice the data rate.

15. The apparatus of claim 13, wherein the first transfer function is 1/(1−D) and the second transfer function is 1/(1−D²), and wherein D is a delay operator.

16. The apparatus of claim 13, wherein the deformatter comprises:

a bit selector which selects only some bits of the multiply-sampled data stream to generate a modified data stream; and a first transfer function reversal unit which applies a reverse of the first transfer function to generate a deformatted read data stream.

17. The apparatus of claim 16, wherein bit selector selects alternating bits of the modified data stream.

18. The apparatus of claim 16, further comprising an error detection circuit which checks the output data by comparing the selected bits of the multiply-sampled data stream with non-selected bits.

19. A reproduction apparatus which reads user data stored on an information storage medium, the apparatus comprising:

a transducing element which obtains a transduced data stream from the medium, the transduced data stream having been recorded using a first transfer function;

a read channel which utilizes a second transfer function and to which the transduced data stream is applied;

a compatibility circuit which derives a data rate from the medium; which causes the read channel to sample the data steam acquired from the medium at a multiple of the data rate, the read channel thereby creating a multiply-sampled data stream; and which manipulates the multiply-sampled data stream to generate a deformatted read data stream;

a buffer to which the deformatted read data stream is transmitted.

20. The apparatus of claim 19, wherein the multiple of the data rate is twice the data rate.

21. The apparatus of claim 19, wherein the first transfer function is $1/(1-D)$ and the second transfer function is $1/(1-D^2)$, and wherein D is a delay operator.

22. The apparatus of claim 19, wherein the compatibility circuit 73 comprises:

a phase locked loop which derives the data rate from the medium and which causes the read channel to sample the data steam acquired from the medium at a multiple of the data rate;

a deformatter which manipulates the multiply-sampled data stream to generate the deformatted read data stream.

23. The apparatus of claim 22, wherein the deformatter comprises:

a bit selector which selects only some bits of the multiply-sampled data stream to generate a modified data stream; and a first transfer function reversal unit which applies a reverse of the first transfer function to generate a deformatted read data stream.

24. The apparatus of claim 23, wherein bit selector selects alternating bits of the modified data stream.

25. The apparatus of claim 19, further comprising an error detection circuit which checks the output data by comparing the selected bits of the multiply-sampled data stream with non-selected bits.

* * * * *